US007917397B1

(12) United States Patent  
Giannini et al.

(10) Patent No.: US 7,917,397 B1  
(45) Date of Patent: Mar. 29, 2011

(54) MERGING PRIVATE IMAGES FOR GIFTING

(75) Inventors: Robert U. Giannini, Hoboken, NJ (US); Joseph L. Parkinson, Boise, ID (US)

(73) Assignee: Jarbridge, Inc., Boise, ID (US)

( * ) Notice: Subject to any disclaimer, the term of this patent is extended or adjusted under 35 U.S.C. 154(b) by 1221 days.

(21) Appl. No.: 11/503,848

(22) Filed: Aug. 14, 2006

Related U.S. Application Data

(60) Continuation-in-part of application No. 10/899,606, filed on Jul. 27, 2004, now Pat. No. 7,418,407, which is a division of application No. 09/527,986, filed on Mar. 17, 2000, now abandoned, and a continuation-in-part of application No. 11/503,848, which is a continuation-in-part of application No. 09/531,102, filed on Mar. 17, 2000.

(60) Provisional application No. 60/159,476, filed on Oct. 14, 1999, provisional application No. 60/167,493, filed on Nov. 24, 1999.

(51) Int. Cl.  
*G06Q 30/00* (2006.01)

(52) U.S. Cl. .......................................................... 705/26

(58) Field of Classification Search .................... 705/26, 705/27  
See application file for complete search history.

(56) References Cited

U.S. PATENT DOCUMENTS

| | | |
|---|---|---|
| 3,590,434 A | 7/1971 | Watts, Jr. et al. |
| 4,149,246 A | 4/1979 | Goldman |
| 4,232,334 A | 11/1980 | Dyson |
| 4,258,478 A | 3/1981 | Scott et al. |
| 4,261,012 A | 4/1981 | Maloomian |
| 4,297,724 A | 10/1981 | Masuda et al. |
| 4,434,467 A | 2/1984 | Scott |
| 4,514,178 A | 4/1985 | Noto et al. |
| 4,539,585 A * | 9/1985 | Spackova et al. ............. 382/100 |
| 4,546,434 A | 10/1985 | Gioello |
| 4,731,743 A | 3/1988 | Blancato |
| 4,839,743 A | 6/1989 | Best et al. |
| 4,843,574 A | 6/1989 | Gerber |
| 4,845,636 A | 7/1989 | Walker |

(Continued)

FOREIGN PATENT DOCUMENTS

| | | |
|---|---|---|
| EP | 0 905 563 A2 | 3/1999 |
| JP | 410124589 | 5/1998 |
| WO | WO 01/04840 A1 | 1/2001 |

OTHER PUBLICATIONS

"High Fashion Meets High Tech" Business Wire (Sep. 28, 1998).

(Continued)

*Primary Examiner* — Mila Airapetian  
(74) *Attorney, Agent, or Firm* — Crawford Maunu PLLC

(57) ABSTRACT

An e-commerce method involving on-line viewing of commercial article through a linking node for virtual merging on another structure. The method includes providing a host site accessible to an on-line viewer (shopper) and web-linkable to a retailer having an apparel site. These articles can be apparel from retail stores for viewing over the web, and the on-line viewer is linked to the host site. The shopper provides a personal-body structure, such as a photograph of a person captured in system memory, which is stored at the shopper's PC. Alternatively, the personal-body structure can be stored at the host site. Using the host site, the shopper is linked to the retailer's apparel site and images of articles are passed from that site to the host site. The images of articles are merged with the personal-body structure for view by the shopper.

17 Claims, 8 Drawing Sheets

U.S. PATENT DOCUMENTS

| | | | |
|---|---|---|---|
| 4,854,880 A | 8/1989 | Nasby | |
| 4,872,056 A | 10/1989 | Hicks et al. | |
| 4,885,844 A | 12/1989 | Chun | |
| 4,931,929 A | 6/1990 | Sherman | |
| 4,964,043 A | 10/1990 | Galvin | |
| 4,991,005 A | 2/1991 | Smith | |
| 5,053,956 A | 10/1991 | Donald et al. | |
| 5,111,392 A | 5/1992 | Malin | |
| 5,117,354 A | 5/1992 | Long et al. | |
| 5,129,719 A | 7/1992 | Dombrosky | |
| 5,163,006 A | 11/1992 | Deziel | |
| 5,163,007 A | 11/1992 | Slilaty | |
| 5,195,030 A | 3/1993 | White | |
| 5,197,016 A | 3/1993 | Sugimoto et al. | |
| 5,206,804 A | 4/1993 | Thies et al. | |
| 5,244,131 A | 9/1993 | Hollingsworth | |
| 5,339,250 A | 8/1994 | Durbin | |
| 5,339,252 A | 8/1994 | White et al. | |
| 5,440,479 A | 8/1995 | Hutton | |
| 5,495,568 A | 2/1996 | Beavin | |
| RE35,184 E | 3/1996 | Walker | |
| 5,504,845 A | 4/1996 | Vecchione | |
| 5,510,846 A | 4/1996 | Guichard et al. | |
| 5,515,268 A | 5/1996 | Yoda | |
| 5,530,652 A | 6/1996 | Croyle | |
| 5,539,677 A | 7/1996 | Smith | |
| 5,550,746 A | 8/1996 | Jacobs | |
| 5,550,976 A | 8/1996 | Henderson et al. | |
| 5,551,021 A | 8/1996 | Harada et al. | |
| 5,555,496 A | 9/1996 | Tackbary et al. | |
| 5,559,714 A | 9/1996 | Banks et al. | |
| 5,568,595 A | 10/1996 | Yosefi et al. | |
| 5,593,072 A | 1/1997 | Hester et al. | |
| 5,598,344 A | 1/1997 | Dangelo et al. | |
| 5,603,043 A | 2/1997 | Taylor et al. | |
| 5,608,852 A | 3/1997 | Hashimoto et al. | |
| 5,611,730 A | 3/1997 | Weiss | |
| 5,625,781 A | 4/1997 | Cline et al. | |
| 5,631,974 A | 5/1997 | Lau-Kee et al. | |
| 5,680,314 A | 10/1997 | Patterson et al. | |
| 5,680,528 A | 10/1997 | Korszun | |
| 5,682,220 A | 10/1997 | Sherman et al. | |
| 5,684,963 A | 11/1997 | Clement | |
| 5,687,259 A | 11/1997 | Linford | |
| 5,694,551 A | 12/1997 | Doyle et al. | |
| 5,708,838 A | 1/1998 | Robinson | |
| 5,724,522 A | 3/1998 | Kagami et al. | |
| 5,729,699 A | 3/1998 | Hashimoto et al. | |
| 5,737,729 A | 4/1998 | Denman | |
| 5,740,801 A | 4/1998 | Branson | |
| 5,742,931 A | 4/1998 | Spiegelhoff et al. | |
| 5,745,681 A | 4/1998 | Levine et al. | |
| 5,754,434 A | 5/1998 | Delfer et al. | |
| 5,754,850 A | 5/1998 | Janssen | |
| 5,768,591 A | 6/1998 | Robinson | |
| 5,774,670 A | 6/1998 | Montulli | |
| 5,781,714 A | 7/1998 | Collins et al. | |
| 5,802,530 A | 9/1998 | Van Hoff | |
| 5,806,046 A | 9/1998 | Curran et al. | |
| 5,822,216 A | 10/1998 | Satchell, Jr. et al. | |
| 5,822,739 A | 10/1998 | Kara | |
| 5,845,263 A | 12/1998 | Camaisa et al. | |
| 5,848,399 A | 12/1998 | Burke | |
| 5,850,222 A | 12/1998 | Cone | |
| 5,850,466 A | 12/1998 | Schott | |
| 5,852,809 A | 12/1998 | Abel et al. | |
| 5,854,850 A | 12/1998 | Linford et al. | |
| 5,864,851 A | 1/1999 | Breitbart et al. | |
| 5,870,140 A | 2/1999 | Gillberry | |
| 5,870,718 A | 2/1999 | Spector | |
| 5,870,771 A | 2/1999 | Oberg | |
| 5,875,108 A | 2/1999 | Hoffberg et al. | |
| 5,880,974 A | 3/1999 | Tarumi et al. | |
| 5,881,234 A | 3/1999 | Schwob | |
| 5,884,029 A | 3/1999 | Brush, II et al. | |
| 5,890,175 A | 3/1999 | Wong et al. | |
| 5,892,946 A | 4/1999 | Woster et al. | |
| 5,895,454 A | 4/1999 | Harrington | |
| 5,905,973 A | 5/1999 | Yonezawa et al. | |
| 5,907,617 A | 5/1999 | Ronning | |
| 5,914,713 A | 6/1999 | Nario et al. | |
| 5,920,830 A | 7/1999 | Hatfield et al. | |
| 5,923,324 A | 7/1999 | Berry et al. | |
| 5,930,769 A | 7/1999 | Rose | |
| 5,937,391 A | 8/1999 | Ikeda et al. | |
| 5,946,665 A | 8/1999 | Suzuki et al. | |
| 5,950,165 A | 9/1999 | Shaffer et al. | |
| 5,950,173 A | 9/1999 | Perkowski | |
| 5,970,471 A | 10/1999 | Hill | |
| 5,974,400 A | 10/1999 | Kagami et al. | |
| 5,978,570 A | 11/1999 | Hillis | |
| 5,978,833 A | 11/1999 | Pashley et al. | |
| 5,983,200 A | 11/1999 | Slotznick | |
| 5,983,201 A | 11/1999 | Fay | |
| 5,983,267 A | 11/1999 | Shklar et al. | |
| 5,986,670 A | 11/1999 | Dries et al. | |
| 5,991,739 A | 11/1999 | Cupps et al. | |
| 5,995,943 A | 11/1999 | Bull et al. | |
| 6,002,855 A | 12/1999 | Ladner et al. | |
| 6,009,413 A | 12/1999 | Webber et al. | |
| 6,014,638 A | 1/2000 | Burge et al. | |
| 6,016,504 A | 1/2000 | Arnold et al. | |
| 6,017,157 A | 1/2000 | Garfinkle et al. | |
| 6,026,368 A | 2/2000 | Brown et al. | |
| 6,026,376 A | 2/2000 | Kenney | |
| 6,026,377 A | 2/2000 | Burke | |
| 6,029,141 A | 2/2000 | Bezos et al. | |
| 6,029,142 A | 2/2000 | Hill | |
| 6,037,936 A | 3/2000 | Ellenby et al. | |
| 6,047,268 A | 4/2000 | Bartoli et al. | |
| 6,052,729 A | 4/2000 | Robinson | |
| 6,058,417 A | 5/2000 | Hess et al. | |
| 6,064,978 A | 5/2000 | Gardner et al. | |
| 6,072,944 A | 6/2000 | Robinson | |
| 6,083,267 A | 7/2000 | Motomiya et al. | |
| 6,089,424 A | 7/2000 | Colquhoun | |
| 6,091,417 A | 7/2000 | Lefkowitz | |
| 6,094,644 A | 7/2000 | Hillson et al. | |
| 6,125,352 A | 9/2000 | Franklin et al. | |
| 6,134,593 A | 10/2000 | Alexander et al. | |
| 6,144,388 A | 11/2000 | Bornstein | |
| 6,170,017 B1 | 1/2001 | Dias et al. | |
| 6,177,936 B1 | 1/2001 | Cragun | |
| 6,236,979 B1 | 5/2001 | Kawabata | |
| 6,260,024 B1 | 7/2001 | Shkedy | |
| 6,293,284 B1 | 9/2001 | Rigg | |
| 6,301,044 B1 | 10/2001 | Huber et al. | |
| 6,304,851 B1 | 10/2001 | Kmack et al. | |
| 6,307,568 B1 * | 10/2001 | Rom | 345/629 |
| 6,310,627 B1 | 10/2001 | Sakaguchi | |
| 6,317,722 B1 | 11/2001 | Jacobi et al. | |
| 6,331,858 B2 | 12/2001 | Fisher | |
| 6,336,136 B1 | 1/2002 | Harris | |
| 6,339,763 B1 | 1/2002 | Divine et al. | |
| 6,343,264 B1 | 1/2002 | Fenton et al. | |
| 6,348,923 B2 | 2/2002 | Murata | |
| 6,349,300 B1 | 2/2002 | Graf et al. | |
| 6,353,770 B1 | 3/2002 | Ramsey et al. | |
| 6,356,264 B1 | 3/2002 | Yasui et al. | |
| 6,366,910 B1 | 4/2002 | Rajaroman | |
| 6,381,583 B1 | 4/2002 | Kenney | |
| 6,404,426 B1 | 6/2002 | Weaver | |
| 6,405,175 B1 | 6/2002 | Ng | |
| 6,405,176 B1 | 6/2002 | Toohey | |
| 6,417,861 B1 | 7/2002 | Deering et al. | |
| 6,437,782 B1 | 8/2002 | Pieragostini et al. | |
| 6,449,660 B1 | 9/2002 | Berg et al. | |
| 6,453,300 B2 | 9/2002 | Simpson | |
| 6,456,938 B1 | 9/2002 | Barnard | |
| 6,567,837 B1 | 5/2003 | Robinson | |
| 6,615,279 B1 | 9/2003 | Robinson | |
| 6,633,849 B1 | 10/2003 | Dodd | |
| 6,665,577 B2 | 12/2003 | Onyshkevych et al. | |
| 6,727,928 B1 | 4/2004 | Richter | |
| 6,771,801 B1 | 8/2004 | Fisher et al. | |

| | | |
|---|---|---|
| 6,785,671 B1 | 8/2004 | Bailey et al. |
| 2005/0027611 A1* | 2/2005 | Wharton .................. 705/26 |
| 2005/0197919 A1 | 9/2005 | Robertson |

OTHER PUBLICATIONS

Szadkowkski, J. "Taking a Walkabout through room design," Washington Times (Sep. 17, 1998).
Cummings, J. "Dream It," Dayton Daily News (Nov. 12, 1998).
Zimmerman, K.A. "Land's End Adds Personalized Models to Web Site catalog Firm Offering Women Chance to Try on Clothes on a Virtual Model," Daily News Record, (Nov. 25, 1998).
"A Sampling of Computer Home Design Programs," Orlando Sentinel (Jun. 14, 1998).
www.weddingchannel.com, link to registry.
"Object-Oriented Analysis and Design," G. Booch, Addison Wesley Longman, Inc. ISBN: 0-8053-5340-2, 1994.
"On Remote Procedure Call," P. Soares, IBM Center for Advanced Studies Conference, vol. 2, pp. 215-267, IBM Press 1992.
Kuchinskas, Susan "The E-commerce Cometh", Media week, vol. 8, No. 35, Sep. 21, 1998 [retrieved from Dialog on Apr. 30, 2002]. Retrieved from Dialog File: 15, Accession #: 01708699.
Hamit, Francis "ModaCAD's Model for Fashion E-Commerce Points the Way to Imaging-Based Interactivity", Advanced Imaging, vol. 14, No. 2, Feb. 1999 [retrieved on Apr. 30, 2002]. Retrieved from Dialog File: 9, Accession #: 02388938.
1999, "The Cosmopolitan Virtual Makeover" www.marketwiz.net?cosmo/press.
Seckler, Valerie "A Fashion Trip for Women on the Web", WWD, Aug. 17, 1998 [retrieved on Apr. 30, 2002]. Retrieved from Dialog File: 570, Accession #: 01683272.
Zimmerman, Kim "Fashion Trip Combines CD, Web Access", DNR, vol. 28, No. 101, Aug. 26, 1998 [retrieved on Apr. 30, 2002]. Retrieved from Dialog File 9, Accession #: 02230722.
Orr, J.N., "Good Design," CAE, vol. 11, No. 6, pp. 62, Jun. 1992.
Taylor, W., "Windows Draw 4.0," PC/Computing, vol. 9, No. 4, p. 204, Apr. 1, 1996.
Anon., Newsbytes News Network, "Comdex—Free Graphics E-mail from SPC Software," Nov. 19, 1997.
Anon., Sunglass Hut's Eyes Are Focused on the Internet,' Chain Store Age Exeuctive, vol. 74, No. 9, p. 188+, Sep. 1998.
Langberg, M., Technology Testdrive Column in San Jose Mercury News, Jan. 10, 1999.
Grimm, M., "Levi Buttons up 501 Blitz," Brandweek, Nov. 22, 1993, p. 4.
Donnally, T., "Coming out of the Cabana," San Francisco Chronicle, May 4, 1996, p. E1.
Vine, R., "Pierre Mercier at Laage-Salomon," Art in America, vol. 84, No. 4, p. 125, Apr. 1996.
Johnson, R.C., "PC Video System Simplifies Security," Electronic Engineering Times, p. 33+, Apr. 8, 1996.
Carrano et al. "Data Abstraction and Problem Solving with C++", second edition, 1998, pp. 15-25.
No author, "Online Shops Linger in Future," HFN, v 70, n 32, p. 12, Aug. 5, 1996. Retrieved from Dialog File: 9, Acc# 01570816.
J.D. Biersdorfer, "Trying on Clothes in a Virutal Dressing Room," Oct. 14, 1999.
Fried, Ian "ModaCAD Latest to Seek Net Gain on Apparel," retrieved on Sep. 3, 1999 from www.apparelnews.net/Archive/082898/fashion/fashfeat.html.
No author, "Internet Venture Plans Virtual Fashion Mall," Nikkei Weekly, Feb. 22, 1999 [retrieved on Apr. 30, 2002]. Retrieved from Dialog File: 728, Accession #: 00885324.
QuickyMart™ Cuts Cost, Eases Set-Up of 'Me-Commerce' Sites: PR Newswire (Jul. 28, 1999).
"Herman Miller's New online 'Room Planner' Makes Designing from Home Fun and Easy" PR Newswire (Mar. 18, 1999).
www.amazon.com.
http://jsharones.com/prod013234.h.
http://www.cspring.com/aero_lettering/c_match.htm.
www.virtualmakeover.com.
www.sesoft.com/customer/index.html.

"The World's First Whole Body Scanners Bring True Human Forms to Computer Graphics," http://www.cyberware.com/pressReleases/first WB.html (May 11, 1995), 1 page.
"ModaCAD Latest to Seek 'Net Gain on Apparel," http:/www.apparelnews.net/Archive/082898/fashion/fashfeat.html (Aug. 28, 1998), 3 pages.
"Wicks and Wilson TriForm® BodyScan booth-first time in USA," www.wwl.co.uk.
"Wicks and Wilson announces its first Body Scanning booth," www.wwl.co.uk.
"Wicks and Wilson TriForms® 3D system helps to take goalkeeping into the space age," www.wwl.co.uk.
"Modacad, Inc. Launches Women's E-commerce 'Style' Shopping site," http//www.urlwire.com/newsarchive/050399a.html (May 3, 1999), 2 pages.
"Populating the Web: Pioneering a paradigm for photo realistic Avatars," http//www.avatarme.com/concept/concept.htm (Aug. 1999), 5 pages.
"PhotoModeler High Quality Photo-Textured Objects," http://www.eossystems.com/phototex.htm (copyright 1995-1999), 10 pages.
Land's End Direct Merchants Catalogue (Sep. 1999), p. 101. www.landsend.com.
"Macys.Com To Sell Borderbund Makeover Software," http//dailynews.yayoo.com/h/nm/19990903/tc/macyscom 2.html (Sep. 3, 1999), 2 pages/.
"If the Jeans Fit . . . p. 3: Three Hours Later," http//www.upside.com (Sep. 3, 1999), 1 page.
"When Off-The Rack Becomes Off-The-Net," Scientific American Presents your Bionic Future (Nov. 1999), 5 pages.
"Macy's Eases Swimsuit Fear with Database," http://www.wired.com/news/news/story/3226.html (Apr. 17, 1997), 2pages.
"Fashion Studio," http://www.dynagraphicsinc.com/main.htm (Sep. 14, 1999), 4 pages.
"What is the Dressing Sim?," http://www.toyobo.co.jp/e/mirai/dr...gsim/TopPage/aboutDressingSim.html (Sep. 14, 1999), 5 pages.
Nebojsa Jojic, http://ww.ifp. uiuc.edu/'jojic/ (Sep. 14, 1999), 5 pages.
A Framework for Garment Shopping over the Internet, Jojic et al., Handbook of Electronic Commerce (May 1999), 22 pages.
Media Motion Publications, Flash 'N Fashion (Copyright1995-1997), 3 pages. www.media-motion.com/.
Meta Creations Poser 4, (Sep. 14, 1999), 3 pages. www.metacreations.com.
"Finding a Look," New York Times (Oct. 14, 1999), 1 page.
"3D Metrics-Capturing the Dimension of Life," http://www.3dmetrics.com (copyright1999), 1 page.
"Welcome to Click Dress," http://www.hi-pic.co.il/ (Dec. 7, 1999), 1 page.
"Killer Loop Virtual Preview," http://www.killerloopeyewear,com/html/klvp.html (Dec. 2, 1999), 1 page.
www.peepsun.com.
http://marketwiz.net.
www.pearlevision.com.
www.beyond.com.
http.//orders.xoom.com.
www.itreviews.com.
"Welcome to Ray Ban Virtual Preview," http://www.rayban.com/htm/rbvp.html (Dec. 2, 1999), 2 pages.
Korolenko, Michael; User's Manual for Fashion Trip software produced by Sierra Home. 1998.
Feb. 5, 1998, http://compucloz.com/ImaginaRelease.html.
Lean Machines, Suzanne Kantra Kirschner, Rolling Stone, New York, Mar. 4, 1999, Issue 807, p. 91, 2 pgs.
"Smallest Hard Drive Unveiled," Rex Farrance, PC World Online, San Francisco, Sep. 9, 1998, p. 1.
J.D. Biersdorfer, "Trying on Clothes in a Virtual Dressing Room." New York Times, Oct. 14, 19991, p. G10. http://proquest.umi.com/.
Toby Kay. "Shopping has never been so easy." The Times, London, Apr. 3, 1999, p. 18 (4 pgs.). http://proquest.umi.com/.

* cited by examiner

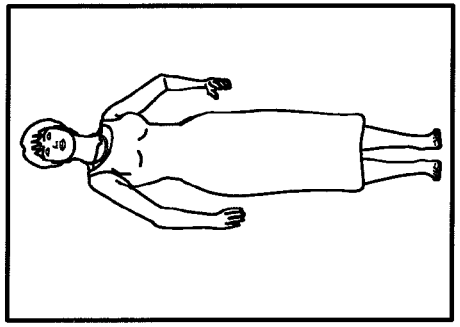
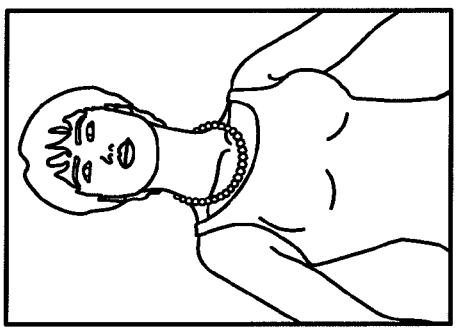
FIG. 3A
+
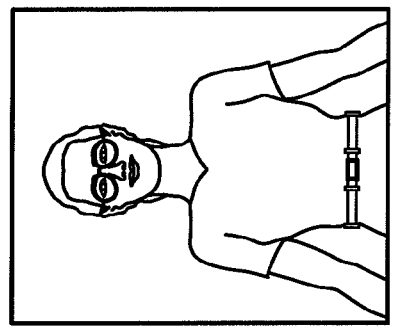
FIG. 3B
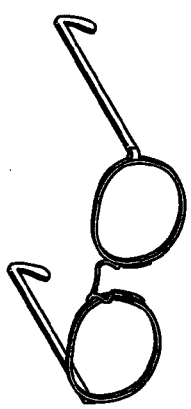
+
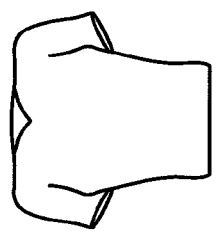

MERGING PRIVATE IMAGES FOR GIFTING

RELATED PATENT DOCUMENTS

This patent document is a continuation-in-part of patent application Ser. No. 10/899,606, filed on Jul. 27, 2004 (U.S. Pat. No. 7,418,407), which is a divisional of patent application Ser. No. 09/527,986 filed on Mar. 17, 2000 (now abandoned), which claims benefit of U.S. Provisional Patent Applications Nos. 60/159,476 and 60/167,493, respectively filed Oct. 14, 1999 and Nov. 24, 1999, to which Applicant claims priority under 35 U.S.C. §120 and which are fully incorporated herein by reference. This patent document is also a continuation-in-part of patent application Ser. No. 09/531,102, filed on Mar. 17, 2000, which is based on and also claims priority to the above-referenced Provisional Patent Applications (Nos. 60/159,476 and 60/167,493).

FIELD OF THE INVENTION

The present invention relates generally to e-commerce and, more specifically, to use of linked web server sites for on-line shopping.

BACKGROUND OF THE INVENTION

Today's consumer is not limited to a particular retailer's or department store's inventory, selection and styles. Traditionally, a consumer shopped for items from different stores with the anticipation and hope that the items would coordinate. Alternatively, a consumer would have to wait for an opportunity to try on different items that were purchased at different places and return those items that did not coordinate. Recent technological advances have attempted to enhance the consumer's shopping ability through the use of e-commerce, sometimes referred to as "online buying" or "online shopping."

There are inherent differences between "online buying" and "online shopping" in that current e-commerce transactions are based on an individual buying goods or services online that they have either decided to buy prior to logging on to the internet or find as a result of bargain hunting on the internet. There is very little, if any, true shopping on the internet. Most people define shopping as an "experience," "fun," "exciting," and the like. True shopping is going to a mall or department store with the intention of buying yet-to-be-determined goods or services. Few consumers are getting on the internet with the same mindset that they have before they physically go shopping. It is the difference between logging onto the internet to buy an additional pair of jeans and going shopping and coming home with two pairs of jeans, a belt, two sweaters and two shirts. Amazon, for instance, tries to recreate the "shopping experience" by offering reviews by other customers and suggestions for other books which may interest the shopper based on the book the consumer is currently purchasing.

The nature of the Internet creates some potential advantages over traditional shopping. The expansive reach of the Internet allows a consumer to shop at stores that are not physically available in the consumer's geographic area or to order merchandise that is not available in the consumer's area. The Internet's perceived anonymity also allows a consumer to shop at a retailer that the consumer finds intimidating or embarrassing.

Problems can arise when a person is "online shopping" with the intent to "online buy" for someone else. This situation is common for birthdays and also in connection with holidays when use of such gifting on the internet peaks. Using apparel as an example, when the online-shopper ("the giver") purchases a shirt for another ("the recipient"), if the shirt is the wrong color, size or style, the recipient typically thanks the giver without addressing the inappropriateness of the gift or asks the giver to exchange the gift for something that the recipient specifies. This practice discourages use of this type of gifting because the giver is burdened with addressing and undoing the transaction thereby transforming an otherwise simple transaction into a relatively complex transaction involving multiple internet communications.

SUMMARY OF THE INVENTION

One aspect of the present invention is generally directed to an e-commerce shopping method involving on-line viewing of commercial articles through a linking node for virtual merging on a personal-body structure. The method includes providing a host site accessible to an on-line viewer (shopper intending to purchase an article) and web-linkable to a retailer having an apparel site. These articles can be apparel from retail stores for viewing over the web, and the on-line shopper is linked to the host site. The on-line shopper provides a personal-body structure, such as a photograph of a person captured/stored in the computer memory. The personal-body structure is stored either at the host site using some type of limited access protocol that is provided by the on-line shopper, or at the shopper's PC so as to maintain privacy. Using the host site, the viewer or shopper is linked to the retailer's apparel site and images are passed from that site for view by the shopper. The images of the articles are then merged with the personal-body structure, forming a composite image that is then displayed for the on-line shopper.

A particular application of the invention is directed to a gifting method via on-line shopping.

The above summary of the present invention is not intended to describe each illustrated embodiment or every implementation of the present invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 3A and FIG. 3B illustrate composite images containing various articles in accordance with two example embodiments of the invention

Figure 1:
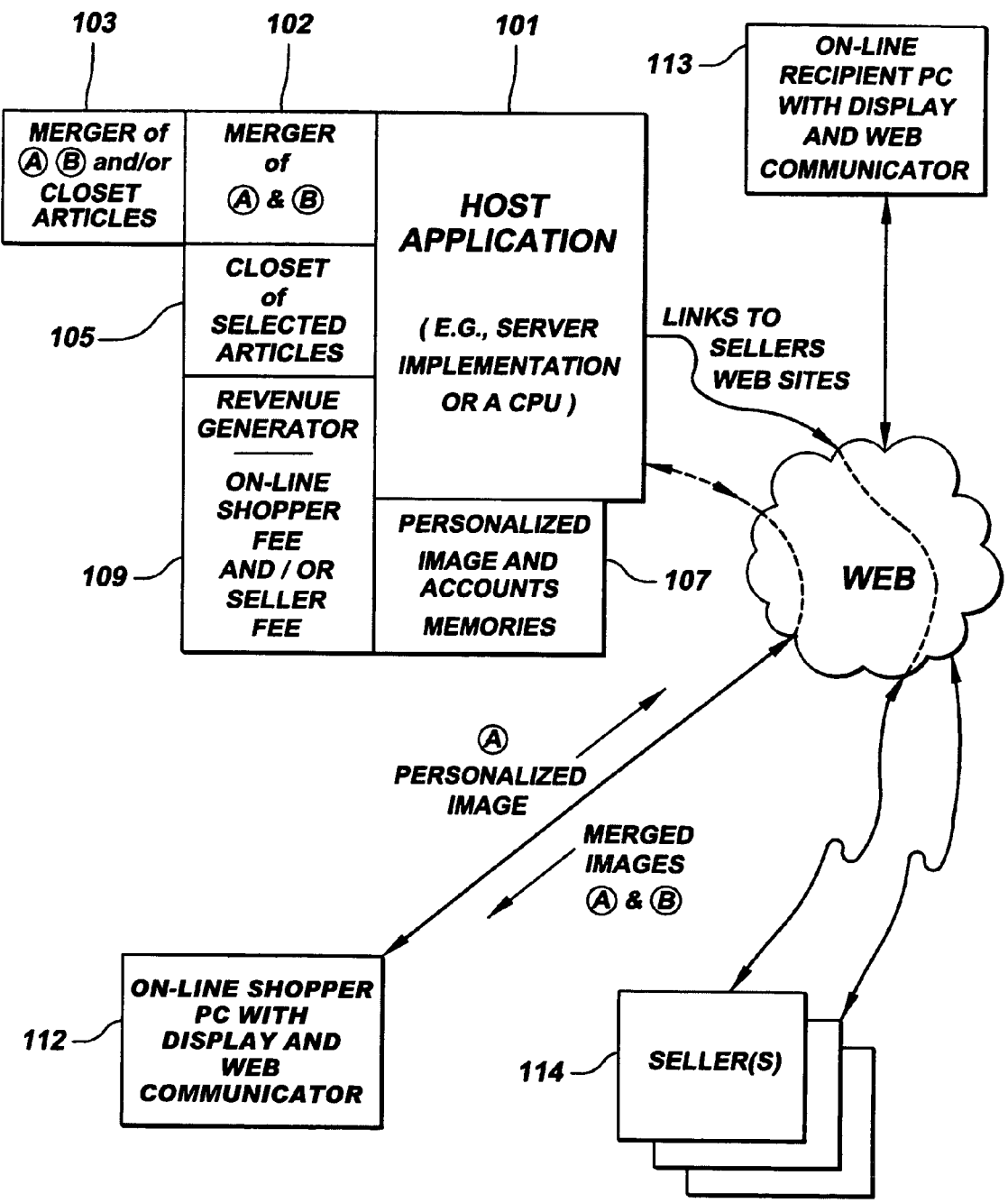
FIG. 1 illustrates a block diagram of a system for implementing the present system in accordance with one example embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a method and system involving e-commerce shopping and gifting over interconnected communication networks such as those currently known as the Internet. The present invention is particularly suited for conveniently bringing virtual apparel into customers' respective homes and permitting customers to try on the apparel before accepting and/or purchasing the apparel. While the present invention is not necessarily so limited, a better understanding of the invention will be found by reading the detailed description and exemplary embodiments that follow.

FIG. 1 illustrates an example embodiment of a method and system for implementing the present system. The system includes a host application server 101 including several example functional blocks. These blocks include a block 102 that merges two images A and B (e.g. corresponding to a personalized or generic article identified by the on-line shopper, and a foundation or structure image to be merged with the identified article). Another block 103 permits merging of images selected from A, B, and/or articles previously stored in a "closet," depicted as block 105. Another block 107 includes personalized images and an inventory of generic images corresponding to the foundation or structure. A revenue generator block 109 provides fee generation from on-line shoppers who subscribe to the host application server per on-line or off-line agreement, and/or fee generation from retailers (or sellers) and others such as magazine publishers desiring participation and benefit from the system of FIG. 1.

The on-line shopper, or "giver", uses a PC or intelligent black box 112 to access the host application server 101. Through this access, the on-line shopper either selects a generic structure from an inquiry of such structures provided by block 107 or provides information for a personal-body structure (for example, a scanned image of himself, the "recipient," an image of a generic prestored model of a man or woman, or an image of prestored model selected by the giver as someone who looks like himself or the recipient) to be used as the structure. The personal-body structure is stored at the host site using a limited access protocol provided by the on-line shopper. In a specific implementation, the limited access protocol includes a password. Using the host application server 101, the on-line shopper is coupled through the web to a seller, depicted at block 114. Images of selectable articles are communicated back to the on-line shopper over the web and through the host application server 101. The on-line shopper selects one or more articles from at least one of the sellers for storage in the closet 105, and/or for merging with the previously-selected structure. Similarly, the structure can be changed per a command from the on-line shopper so as to merge the selected article(s) with different structures. In response, the host application server 101 processes images corresponding to the article and structure and generates a new image including representations of both the structure and the article. The new image is then is displayed for the on-line shopper. The selected article(s) may then by purchased by the on-line shopper. If the on-line shopper wishes to gift the selected article(s) to a recipient, the new image also may be electronically sent, e.g., as part of an email wishing the recipient a "happy birthday." In the example shown in FIG. 1, this occurs over the web to the recipient's PC or intelligent black box 113.

In response to receiving the image (e.g., via email), depending upon the implementation, the recipient has a number of options. Where the implementation involves the giver and the recipient being members of an on-line shopping subscription service provided by the host application 101 (e.g., consideration paid monthly or by use), the recipient logs onto the host application 101 via a link provided with the email and opens the file for displaying the image. If desirable, the recipient can accept the gift and thereby automatically cause the host application 101 to charge the purchase to the giver (optionally, without the recipient seeing the purchase price). If the gift is undesirable, the recipient can shop for and select an alternate gift by accessing articles provided by sellers 114 via the host application 101 and/or changing the structure upon which the articles are modeled. The recipient may also provide information for a personal-body structure for viewing with the articles. The personal-body structure is stored at the host site using a limited access protocol provided by the recipient. In a specific implementation, the limited access protocol includes a password. Once the recipient finds and selects the desired article, the selection automatically causes the host application 101 to charge the purchase to the giver. If the giver has set a predetermined spend limit on the gift and the recipient's selection exceeds the limit (or has place a time limit when the gift selection is no longer valid), the host application 101 can reject the selection and explain the occurrence to the recipient (e.g., request that the recipient shop for and select a less expensive gift or, alternatively, the host application 101 can email the giver and ask for approval on the higher amount). When initiating this gift transaction, the giver can elect which protocol to use. In response to a completed selection, the giver is sent a confirming email that identifies various data about the transaction, including, for example, the gift selected, the price, the shopping time period, the time at which the gift was selected. The recipient is also provided an email with instructions explaining how to exchange the gift once it is received from the retailer (optionally via the host application 101).

If the recipient is not a member of the database, the giver can elect to use a guest pass or pay an additional amount for a use by the recipient. The host application 101 can also invite the recipient to become a member.

The present invention encompasses variations as well. For example, as an alternative the recipient can be provided a gift certificate in response to not selecting any gift or not choosing to become a member. The above approach is advantageous in that there is no transaction, and therefore no charge, until the recipient selects the gift, and the seller does not have to deal with any returned items.

In another variation, the on-line shopper, or the "giver" as the application might call for, uses a PC or intelligent black box 112 to access the host application server 101. Through this access, the on-line shopper either selects a generic structure from an inquiry of such structures provided by block 107 or provides limited information pertaining to a personal-body structure (for example, a scanned image of himself, the "recipient," an image of a generic prestored model of a man or woman, or an image of prestored model selected by the giver as someone who looks like himself or the recipient) to be used as the structure. Rather than storing the personal-body structure at the host site, the personal-body structure (e.g., the representative information) is stored by the shopper's CPU so as to avoid revealing any such information to any retail representative or e-commerce hub, and thereby alleviating or mitigating the need for a limited access protocol provided by the on-line shopper. In a specific implementation, the limited access protocol includes a password. Using the host application server 101, the on-line shopper is coupled through the web to a seller, depicted at block 114. Images of selectable articles are communicated back to the on-line shopper over the web and through the host application server 101. The on-line shopper selects one or more articles from at least one of the sellers for storage in the closet 105, and/or for merging with the previously-selected structure stored at the shopper's CPU. Similarly, the structure can be changed per a command from either the on-line shopper or by the shopper's selection at the shopper's CPU so as to merge the selected article(s) with different structures. In response, the host application server 101 and the shopper's CPU process data for merging the images of the article(s) and structure accordingly. The new image is then is displayed for the on-line shopper either at the shopper's CPU or at the host application server 101. The selected article(s) may then by purchased by the on-line shopper. The new image also may be electronically sent from the shopper's CPU in dressed form so as not to reveal any private or personal attributes of the selected personal-body structure. If the on-line shopper wishes to gift the selected article(s) to a recipient, the new image also may be electronically sent, e.g., as part of an email wishing the recipient a "happy birthday." In the example shown in FIG. 1, this occurs over the web to the recipient's PC or intelligent black box 113.

Figure 2:
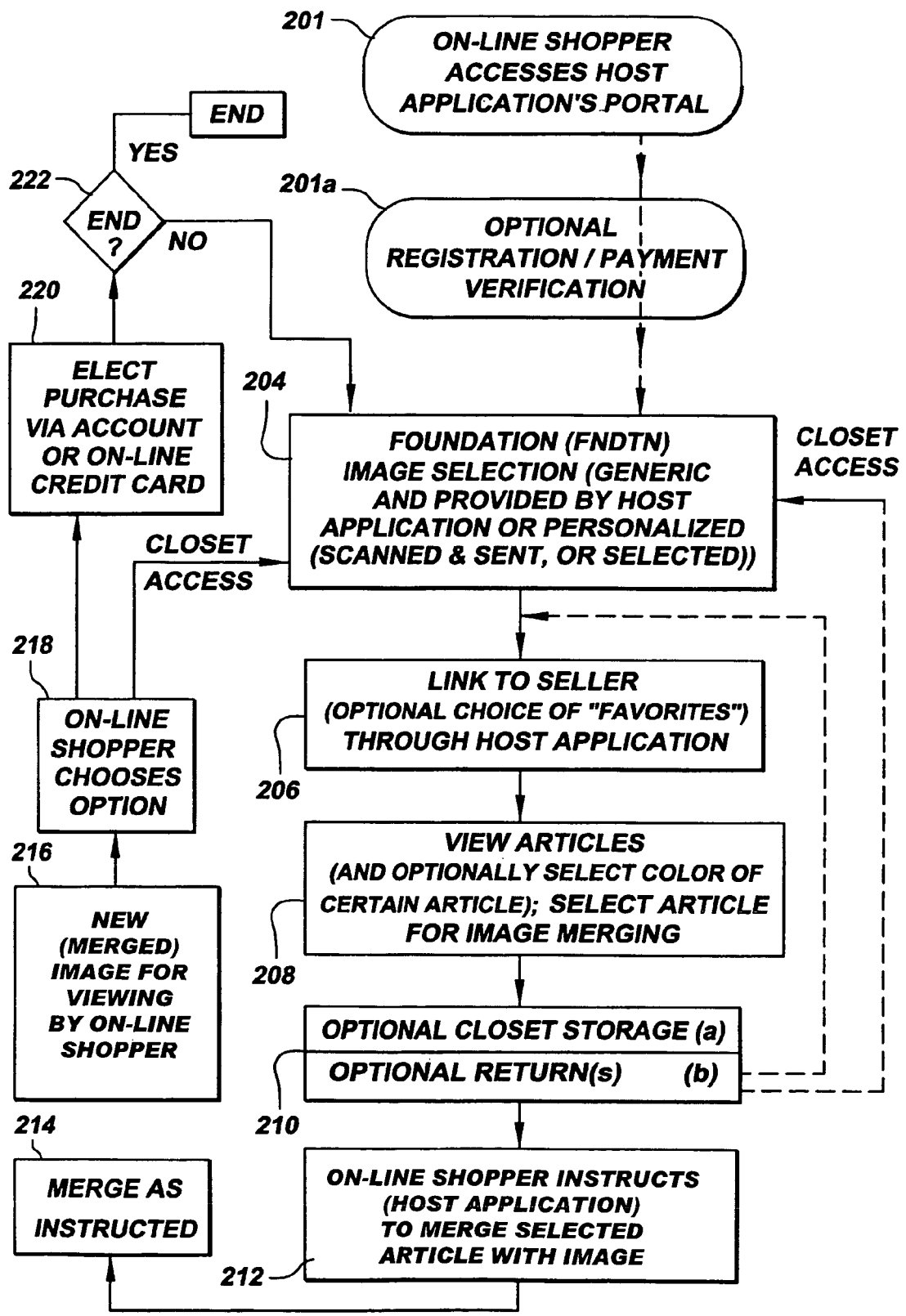
FIG. 2 is a flowchart of an example manner for implementing one aspect of the present invention.

FIG. 2 is a flow chart of an example process for implementing the example system of FIG. 1, according to the present invention. It will be understood that the recipient can have the same shopping experience as the giver. As discussed above, after accessing the host application server 201, optionally the host application server verifies registration/payment as is conventional with current on-line shopping as depicted at 201a. At block 204 the structure or foundation is selected as discussed above, and at block 206 the link is made to the seller. At block 208 the article(s) is viewed by the on-line shopper and, optionally, a selection of a color and/or size for the article is made. Next, the on-line shopper selects the article as a candidate for storage in the closet and/or for merging with the structure.

At block 210 the on-line shopper instructs the host application server to store the article in the closet by returning to block 204, merge with the structure as depicted at block 212, or return to block 206 for linking to the same seller or another seller for additional viewing. As further depicted at block 212, the structure is stored at either the shopper's PC (112 of FIG. 1) or at the Host-site memory (107 of FIG. 1).

From block 212, flow proceeds to block 214 where the new image is created per the merger instruction.

Next, at block 216, the new image is presented for viewing to the on-line shopper.

At block 218 the on-line shopper chooses one of multiple options. The closet is accessed and the on-line shopper returns to block 204, or an election is made to purchase the article and/or other articles that may have been stored in the closet as depicted in block 220. From block 220, flow proceeds to block 222 where the on-line shopper decides to return to block 204 or end the transaction.

Example articles can be: A) clothing; B) paint; C) furniture; D) glassware; E) landscaping; F) orthodontic and teeth ware; G) cabinetry; H) plastic-surgery type enhancements; I) car/person.

Example foundation for merger with corresponding article (s) can be: a) person, pet; b) house, cars, etc.; c) house, cars, office, etc.; d) kitchen, face; e) yard; f) mouth; g) rooms in office/house; h) person (chest, face, belly, etc.); I) person/car.

In one example embodiment the commercial articles include services offered by the article-providers or merchants, such as, cosmetic surgeries offered by plastic surgeons and dental procedures offered by dentists.

In a further example embodiment the on-line shopper can view how their personal-body structure would look after being altered by various plastic-surgery type enhancements. The on-line shopper would choose a type of enhancement as the article, and the article would then be merged with the personal-body structure. The resulting image would show what the personal-body structure would look like after the surgical enhancement. Example enhancements include but are not limited to: A) collagen injections; B) hairpiece; C) liposuction; D) face-lift; E) breast enhancement/reduction; F) lip enhancement; G) nose job. The on-line shopper could then add a second cosmetic surgery to their modified personal-body structure from a different article-provider (e.g., the second cosmetic surgery is provided by a different plastic surgeon then the first cosmetic surgery). In this manner, the on-line shopper can modify their personal-body structure with a number of cosmetic surgeries offered by the same or different plastic surgeons. The various enhancements to the personal-body structure may be displayed with or without additional commercial articles, such as apparel.

In another example embodiment the on-line shopper can view how their personal-body structure would look after being altered by various dental services. The on-line shopper would choose a type of dental service as the article, and the article would then be merged with the personal-body structure. The resulting image would show what the personal-body structure would look like after the dental service. Example services include but are not limited to: A) teeth whitening; B) braces; C) veneers; D) dentures.

In an additional example embodiment the on-line shopper can send their personal-body structure either to an article-provider site or send a generic representation thereof, for use by a plastic-surgeon retailer who offers various types of cosmetic surgeries. In response to images sent by a CPU at the plastic-surgeon retailer, the desired article (e.g., a type of surgical enhancement), is merged with the personal-body structure for forming a composite image, including a visual representation of what the structure would look like after the surgical enhancement. The on-line shopper can then view what their personal-body structure would look like after a certain type of cosmetic surgery. Through this process, the on-line shopper can view how their personal-body structure would change after various surgical enhancements. For example, the on-line shopper can send a personal-body structure of their face to one plastic surgeon, receiving back information (pricing and/or how he/she would look after a facial reconstruction), and then decide to purchase the service for this enhanced personal-body structure and/or compare with different plastic surgeons. Also, this composite image can be added to with one or more other enhancements from the same or different plastic surgeons. In this way the on-line shopper can view how their body would look after various surgical enhancements which can be offered by different plastic surgeons that specialize in different types of procedures. The on-line shopper can also view the enhanced personal-body structure in combination with various other articles, e.g., clothing, from other article-provider sites.

In another example embodiment according to the present invention, an important advantage relating to color matching is achieved using a commonly-used color standard that covers sufficient color variations to permit various articles to be matched to one another. In one more specific embodiment, an industry color-standardization scheme is used. Examples include: Exxel Color Match Guide (see the website for "The J Sharones Online Internet Showroom") and Color match Chart (see the website of CSprings-Aereo Lettering Graphics). More sophisticated color standardization schemes include the above examples in combination with equipment specifically identifying a frequency range corresponding to the color of the article in question or the equipment approach by itself.

Example equipment of this type includes optics-based detectors adapted to provide a measured (color) frequency in a given light condition/environment. For example, white light may be used along with selected background materials characterized within certain selected ranges of reflectivity. Other definitional parameters needed and/or useful in connection therewith will be apparent to those skilled in the art.

In a particular application, the color frequencies measured for the articles to be matched are reported and provided in the form of a tag that is carried with the article, electronically for the web server shopping function and, optionally, as a supplemental hard-copy coded label (e.g., as part of or as a supplementation to the coding used on a bar code label). In a more particular implementation involving this use as part of the bar code label, the conventional bar code scanners and bar code generators are modified and adapted to receive the color frequency of the article and to conveniently report the color frequency in conjunction with the electronic shopping function and/or the conventional/reality shopping applications.

In yet another more specific embodiment, the closet of selected articles (as described for example in connection with block 105 of FIG. 1) is electronically defined using a partial-data set corresponding to each of the closeted articles. In one application thereof, the partial-data set comprises an outline definition of each of the articles along with the color frequency codes linked to the various sections of each article, as necessary to fully define the article in terms of article shape and color. Further, the size of the article is also stored as part of the partial-data set. Collectively, these various pieces advantageously define all needed aspects of each article in the closet without having to consume excessive amounts of memory and without requiring excessive processing to recreate the article for view by the user.

The virtual closet discussed above in connection with FIG. 1 can be used to permit the shopper to buy or hold (without buying) an article and subsequently retrieving the article for matching to other articles in terms of structure, size, color and other stylistic aspects. In applications concerned with limited memory bandwidth, the host application can provide a maximum amount of storage space for each shopper, with additional storage space being provided for a fee. These data stored in such memory is limited to a fixed-period, e.g., one month, with extensions being provided for yet additional consideration, such as a monthly fee or purchases of items stored in the closet during an immediately preceding period. This approach advantageously encourages the shoppers to revisit the host application repeatedly to access their personalized virtual closet, and advantageously provides on-going advertising for (which is also optionally billed on a related, on-going basis to) the seller/retailers.

According to another aspect of the present invention, on-line shoppers (for example 112 of FIG. 1) are provided a number of selectable icons or other data permitting feedback from the host/server (for example 101 of FIG. 1). Examples include: expert fashion advice (e.g., professional consultants employed by the retailers (for example sellers 114 of FIG. 1), outside fashion consultants and/or employees of the entity providing the host application (101 of FIG. 1); on-line offers from the sellers (discounts, sales, etc.); updates on up-coming styles, colors, the most recent and hottest fashions. Each of these various offerings is optionally categorized for convenient selection by the shopper/user, for example, by category, style, activities, retailers. Advantageously, this application permits the host application to provide the sellers unique demographic information pertaining to particular customers' interests, selection trends and other data useful in attracting the shoppers to the retailers.

FIG. 3A and FIG. 3B illustrate example embodiment of the present invention. The on-line shopper can select multiple items from the same or different article provider sites and a composite image of the complete outfit is displayed on the shoppers PC before finalizing purchase.

Figure 4:
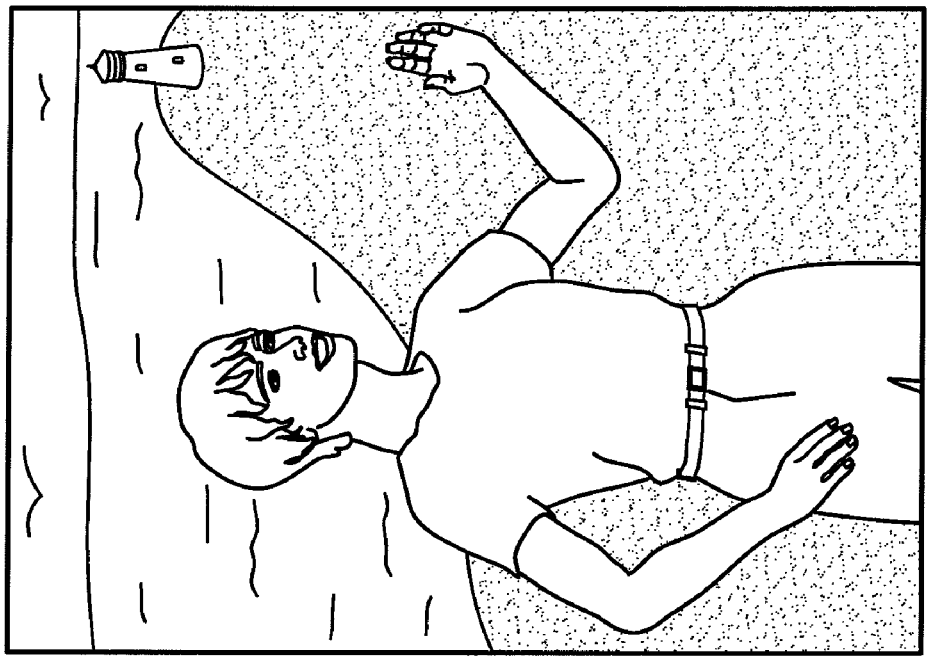
FIG. 4 illustrates a composite image displayed with a background setting in accordance with one example embodiment of the invention.
Figure 4:
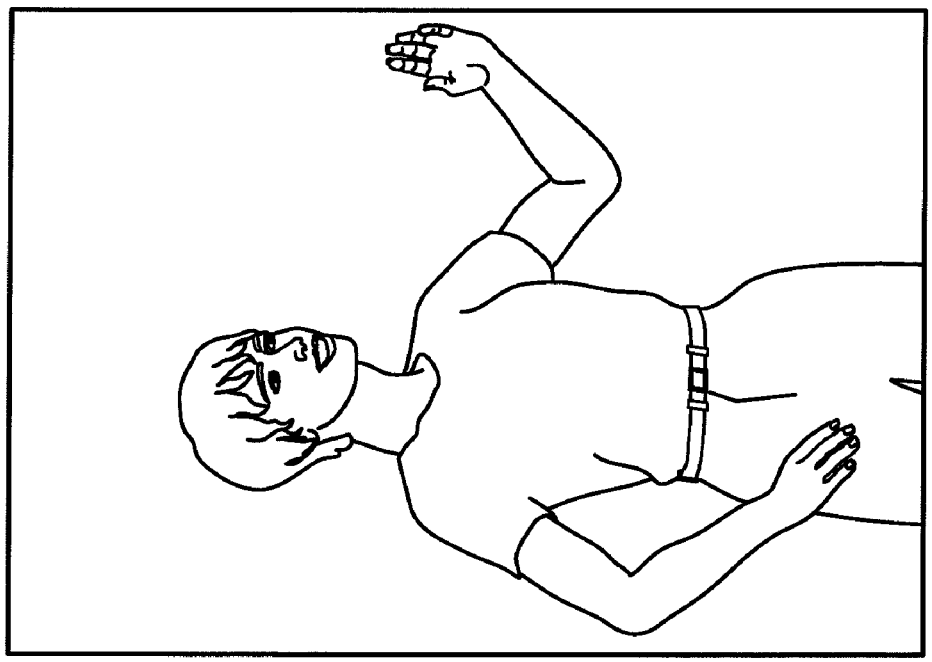

FIG. 4 illustrates an example embodiment that the composite image can be combined with different background setting and displayed for the on-line shopper on their PC.

Figure 5:
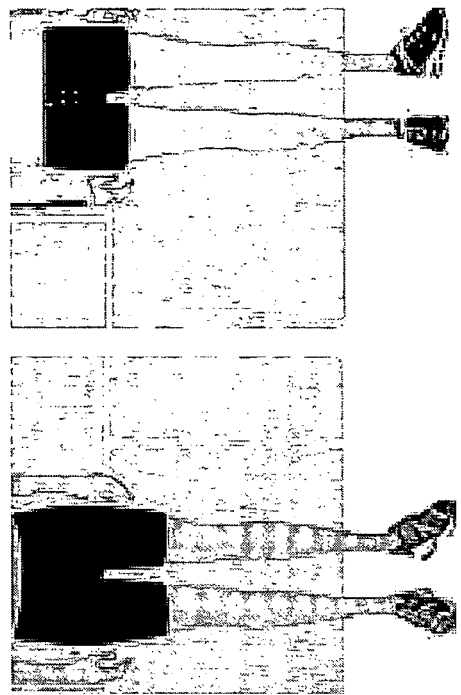
FIG. 5 and FIG. 6 illustrate that a composite image can be stored in accordance with two example embodiments of the invention.
Figure 5:
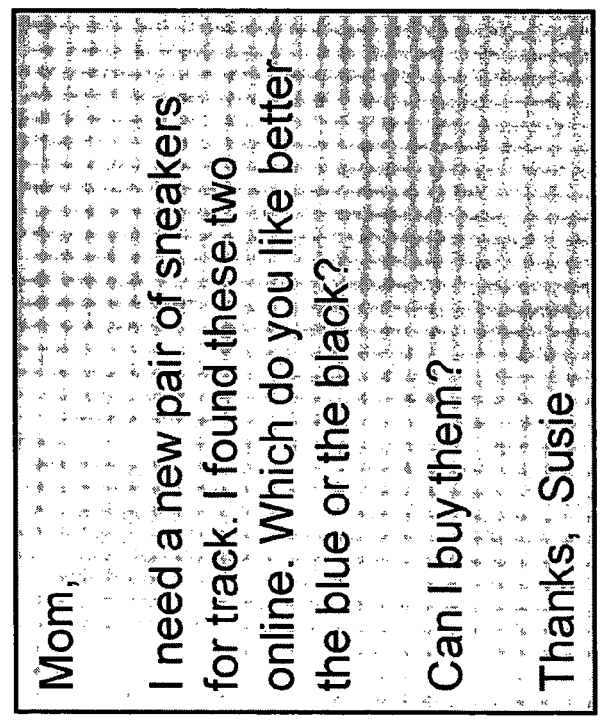
Figure 5:
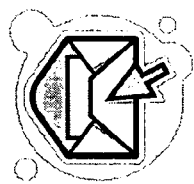
Figure 6:
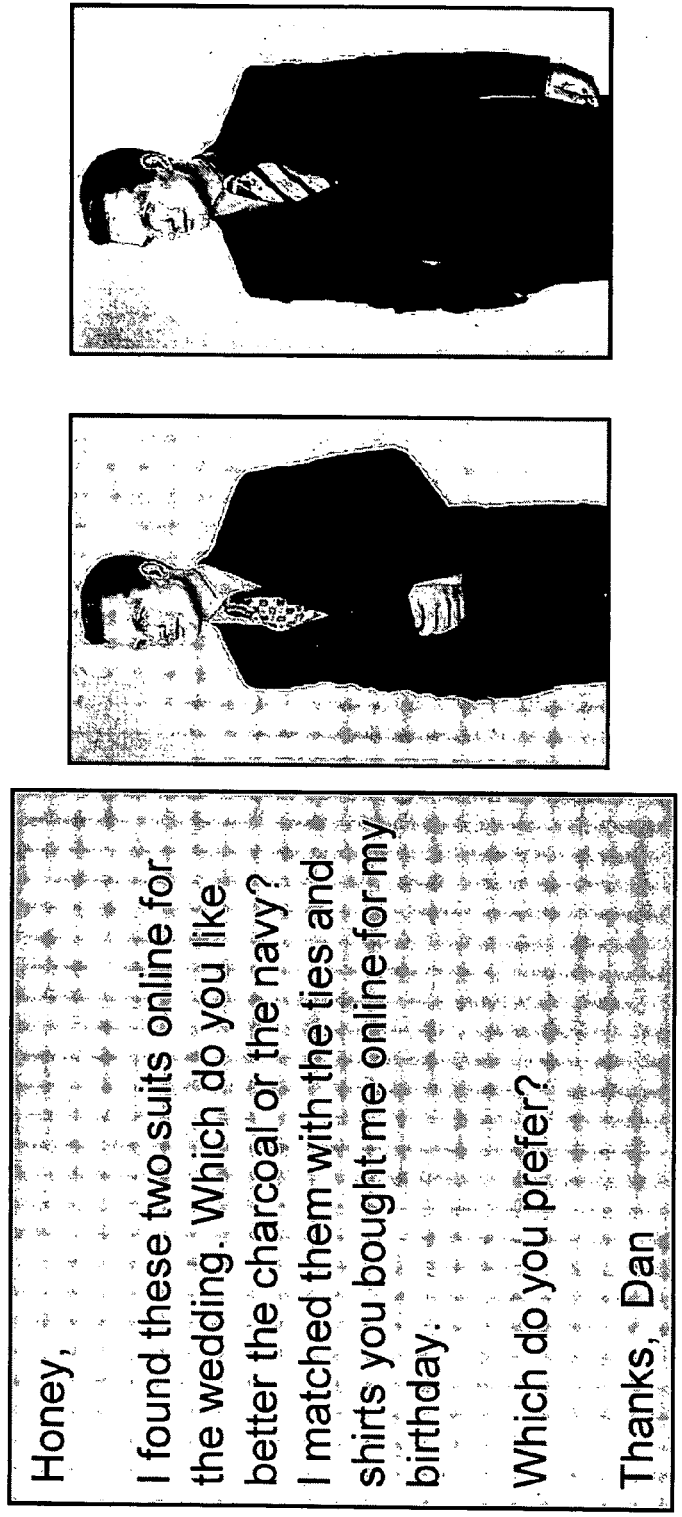
Figure 6:
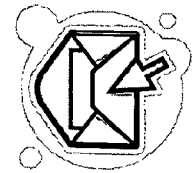

FIG. 5 and FIG. 6 illustrate two example embodiments that the on-line shopper can store and/or email the composite image along with a message for peer, family, friend review and/or approval before subsequently finalizing purchase. For example, the on-line shopper can send the composite image to a parent or spouse to get final approval before purchasing an article.

Figure 7:
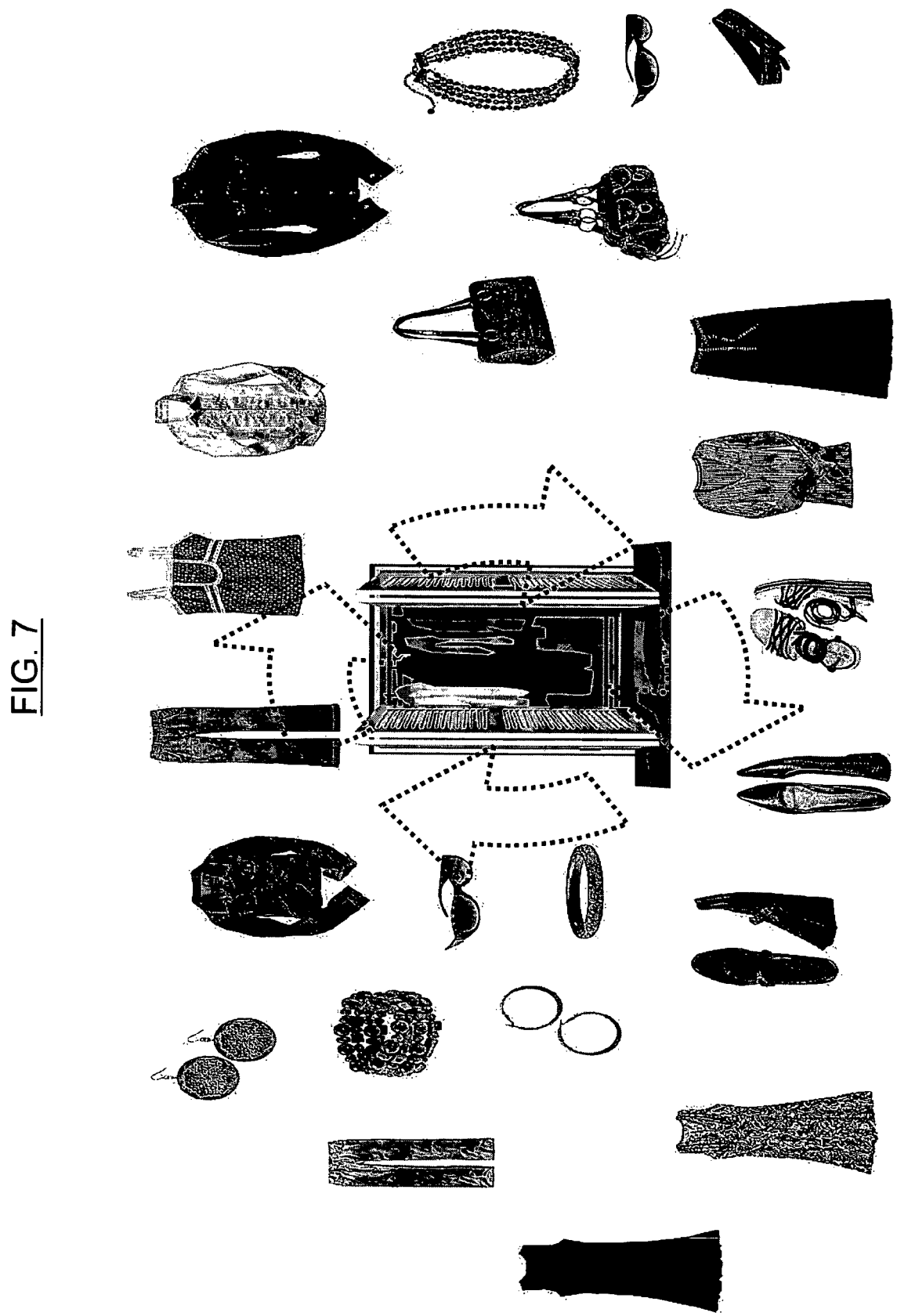
FIG. 7 illustrates a virtual closet in accordance with one example embodiment of the invention.

FIG. 7 illustrates an example embodiment of a virtual closet. The on-line shopper can store articles in a virtual closet and continue shopping. The articles can be stored for viewing at later time or can be mixed and matched to create new outfits and displayed as part of a composite image before the shopper purchases the articles.

Figure 8:
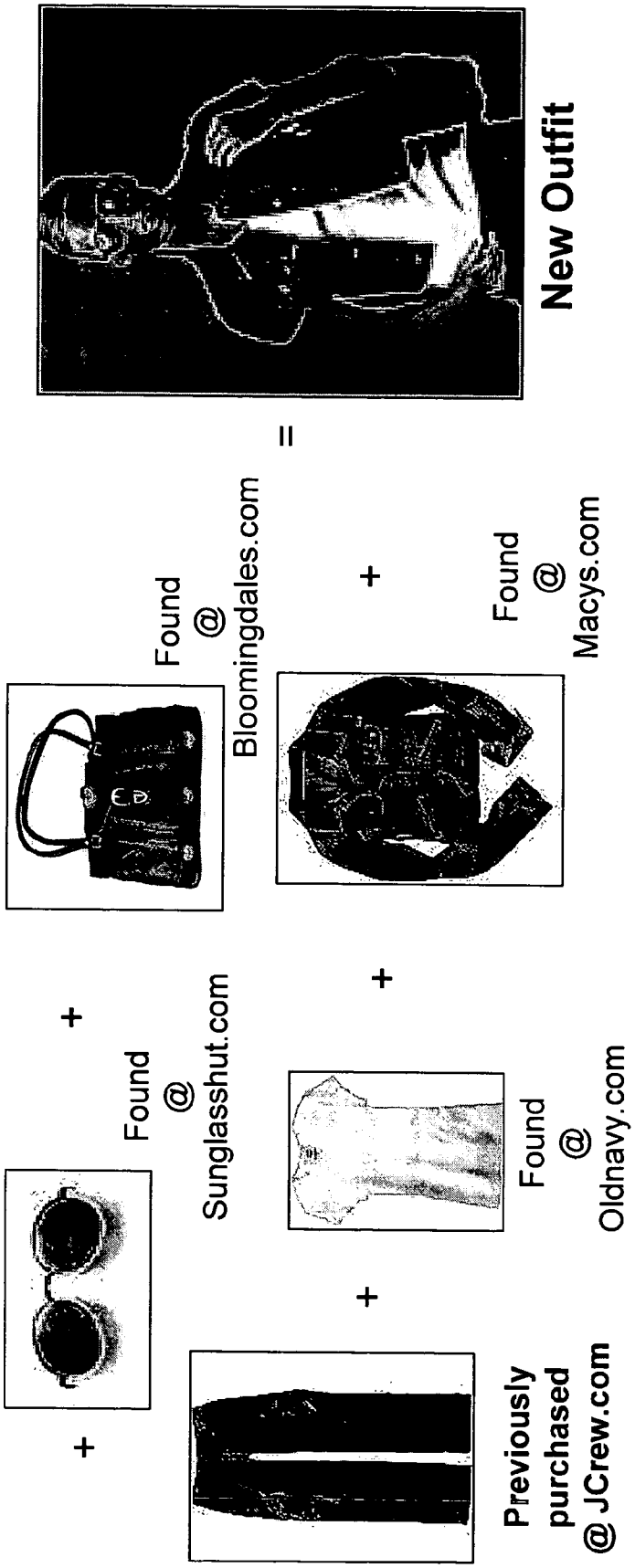
FIG. 8 illustrates the use of a virtual closet in accordance with one example embodiment of the invention.

FIG. 8 illustrates an example embodiment that the on-line shopper can retrieve items stored in the virtual closet and then mix and match the retrieved articles with previously purchased closeted items and/or newly selected items prior to purchasing. For example, the on-line shopper can create a new outfit by combining previously purchased pants with a new shirt from one article provider, a new pair of sunglasses from another article provider, a jacket from a different article provider and a purse from yet another article provider. The shopper can then review the composite image and continue to mix and match various articles and/or finalize purchase of some or all of the articles.

For convenience to the shoppers, a feedback icon can be used to provide a "favorite retailers" list to be defined by each shopper. When the shopper logs onto the host application, any of these favorite retailers can be immediately linked to for various uses. Examples include: reviewing closeted items and making changes thereto for a particular retailer, checking sales at that particular retailer and/or continuing to shop at a particular retailer without being required to return to the host application web site. Further, as a shopper links from retailer to retailer (the "Favorites"), a "shopping basket" can be selected and filled as the shopper accesses the articles.

According to another important aspect of the present invention, the host application includes a search engine that searches selected, or all, participating sellers/retailers for particular merchandise, as identified by the on-line shopper. In one implementation, this service is provided to the shopper using a selectable icon or other feedback data as discussed above. At this point, the host application can: list all such retailers and allow the shopper to link to their web site; virtually pull the item from the respective web sites and allow the shopper to "try on" the article or store it in the closet (with a variation which optionally permits the shopper to change the size and color); and/or a combination of these approaches.

Implementation of the merging function can be accomplished using one or more of a variety of currently-available methods. Examples of such methods include those used in connection with web sites: (see the website for virtual make-over) and (see the website for sega soft).

Other example implementations are described and illustrated in U.S. Pat. No. 5,930,769 entitled, "System and Method for Fashion Shopping." Various types of software and hardware can be used to implement each aspect of the system and method described.

Various commercially available software-based products can be used to implement certain aspects of the claimed invention. For example, OptiTex 3D Draping Solution is a apparel modeling software system for 3D Garment Draping and 3D Visualization. Another example is the 3DiView product offered by Visionix which captures a 3D facial view using multiple digital cameras in a short period of time (e.g., in seconds). With this view clients can then virtually "try-on" a variety of 3D eyeglass frames from an extensive database until they find a pair that they like on their face. Frames are displayed on the computer screen and are visible from a variety of angles. Further examples include the website for nikegoddess which allows users to mix and match outfits, and Bodymetrics (Le Bon Marche in Paris and Selfridges & Co. in London) which uses scanners installed and maintained by Shape Analysis for its custom jeans operations.

As noted above, the present invention is applicable to a number of techniques for merging various types of structures, or foundations, with one or more corresponding articles. The present invention should not be considered limited to the particular examples described above, but rather should be understood to cover all aspects of the invention as fairly set out in the attached claims. For example, the present invention could be characterized as covering one or more of the above characterized features. Accordingly, various modifications, equivalent processes, as well as numerous structures to which the present invention may be applicable will be readily apparent to the skilled artisan upon review of the present specification.

What is claimed is:

1. A method for previewing an article on a personal-body structure, comprising:
   providing a host site accessible to an on-line shopping PC operated by an on-line shopper and web-linking the on-line shopping PC to a plurality of article-provider sites, the article provider sites having images of commercial articles for view via the web;
   linking the on-line shopping PC to the host site;
   providing to the host site, from the on-line shopping PC, information for dressing a personal-body structure that is stored at the on-line shopping PC;
   using the host site, linking the on-line shopping PC to a set of retailers including different article-provider sites and passing respective visual images of commercial articles from the set of article-provider sites to the host site for view at the on-line shopping PC by the on-line shopper;
   at the on-line shopping PC, merging images of the commercial articles and the personal-body structure by forming a composite image including a visual representation of the commercial articles on the personal-body structure;
   displaying the composite image.

2. The method of claim 1, wherein at least one of the images of the commercial articles selected by the on-line shopper is stored at the host site with the personal-body structure at least partially covered by said at least one of the images of the commercial articles.

3. The method of claim 2, wherein the at least partially covered personal-body structure is stored using a limited access protocol provided by the on-line shopper.

4. The method of claim 3, wherein the limited access protocol includes a password.

5. The method of claim 4, wherein the on-line shopper uses the password to access and to view at least one of the stored images of the commercial articles and the at least partially covered personal-body structure.

6. The method of claim 1, further comprising purchasing at least one of the commercial articles after displaying the composite image.

7. The method of claim 1, wherein each of the commercial articles is apparel.

8. The method of claim 1, wherein at least one of the commercial articles represents a portion of the personal-body structure to be modified.

9. The method of claim 8, wherein said at least one commercial article is provided by cosmetic surgery.

10. The method of claim 9, wherein said at least one commercial article is provided by facial cosmetic surgery.

11. The method of claim 10, wherein the facial cosmetic surgery is supplied by one article-provided site and at least a second commercial article is provided by cosmetic surgery and the second commercial article is supplied by a different article-provider site.

12. The method of claim 9, wherein the personal-body structure is sent from the host site to the article-provider, the article provider then forms a composite image of the personal-body-structure after the cosmetic surgery and then sends the composite image back to the host site.

13. The method of claim 8, wherein the composite image includes apparel.

14. The method of claim 1, wherein the personal-body structure represents attributes of a recipient to be gifted by the on-line shopper.

15. The method of claim 1, wherein at least two of the visual images of the commercial articles passed from the set of article-provider sites to the host site are of different colors and the host site is adapted to indicate whether the colored commercial articles are similar.

16. The method of claim 1, further comprising:
    selecting an image of a background setting prior to generating the composite image, and wherein the composite image it formed form the personal-body structure, the commercial articles, and the image of the background setting.

17. A computer-based system for previewing an article on a personal-body structure, the article provided in response to a selection from articles provided by a set of retailers, comprising:
    an on-line shopping PC for operation by an on-line shopper, and a host site accessible to the on-line shopping PC and to web-link the on-line shopping PC to a plurality of article-provider sites, the article provider sites having images of commercial articles for view via the web, wherein the host site is adapted to link the on-line shopping PC to the host site;
    a data processing arrangement, including memory, at the on-line shopping PC for storing information representing a personal-body structure and for providing to the host site, from the on-line shopping PC, information for dressing the personal-body structure; wherein the host site is used to link the on-line shopping PC to the set of retailers, including different article-provider sites, and to pass respective visual images of commercial articles from the set of article-provider sites to the host site for view at the on-line shopping PC by the on-line shopper; and wherein the on-line shopping PC is adapted to merge images of the commercial articles and the personal-body structure by forming a composite image including a visual representation of the commercial articles on the personal-body structure, and is adapted to display the composite image.

* * * * *